(No Model.)
W. R. PATTERSON.
TEST CIRCUIT FOR TELEPHONE CABLES.
No. 369,122. Patented Aug. 30, 1887.
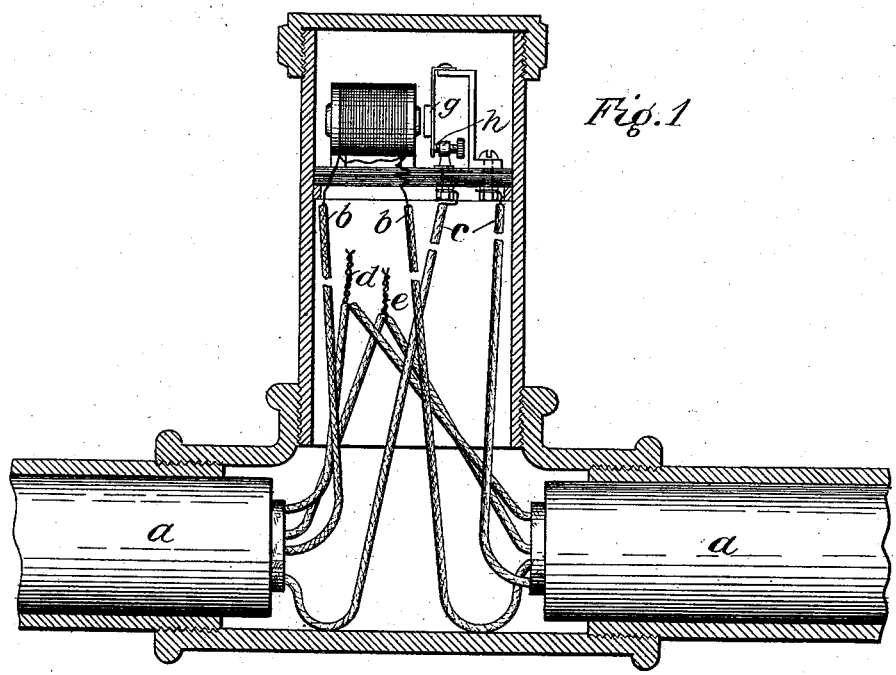
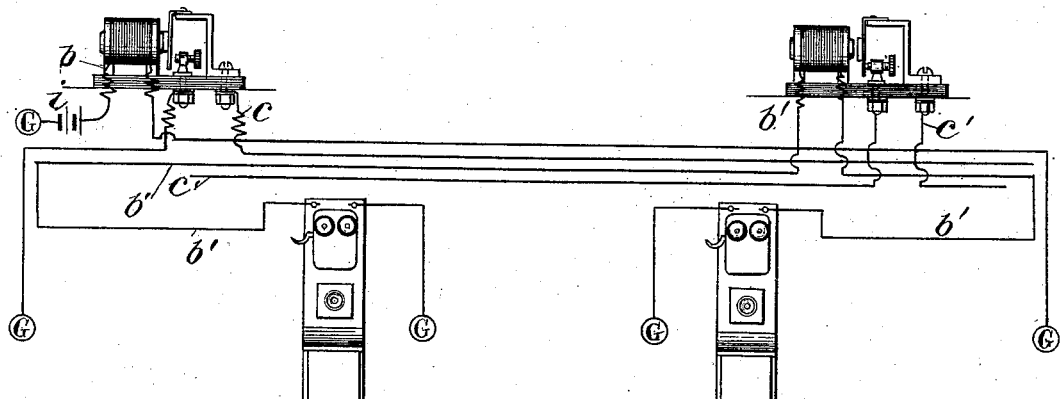
Witnesses:
Sam'l B. Dover.
Leopold Stern.
Inventor.
William R. Patterson
By George L. Baston
Atty.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

TEST-CIRCUIT FOR TELEPHONE-CABLES.

SPECIFICATION forming part of Letters Patent No. 369,122, dated August 30, 1887.

Application filed August 16, 1886. Renewed July 14, 1887. Serial No. 244,264. (No model.)

*To all whom it may concern:*

Be it known that I, WILLIAM R. PATTERSON, a citizen of the United States, residing at Chicago, in the county of Cook and State of Illinois, have invented a certain new and useful Improvement in Test-Circuits for Telephone-Cables, (Case 64,) of which the following is a full, clear, concise, and exact description, reference being had to the accompanying drawings, forming a part of this specification.

My invention relates to testing apparatus for locating approximately faults in telephone-cables; and my invention consists in providing at intervals throughout the length of the cable circuit-breaking devices for opening, when desired, certain of the conductors, so that the wires thus opened may be tested from the end to determine whether there is any escape between the end where the test is made and the point where the wire has been opened.

My testing system as herein described is designed for use in cables in which cores of separately-insulated conductors are protected from moisture by an exterior water-proof covering. In such cables any injury to the lead pipe or other water-proof covering will affect the insulation of all the conductors, and thus by locating the escape on any one of the wires the fault in the pipe may be discovered and repaired.

My invention is illustrated in the accompanying drawings, in which—

Figure 1 is a detailed view of the circuit-breaking device at one point in the length of the cable. Fig. 2 is a diagram of the circuits of a telephone-cable provided with my testing apparatus.

As shown in Fig. 1, the cable $a$ may contain many conductors. I have illustrated in said figure only four conductors, $b$, $c$, $d$, and $e$. The cable may contain as many conductors $d$ $e$ as may be required. The armature $g$ and its opposing contact-point $h$ are included in the circuit of conductor $c$, the circuit of conductor $c$ being normally closed by the armature-lever held against said contact-point. It is evident that on magnetizing electro-magnet $f$ the armature $g$ will be attracted and will thus open the circuit of wire $c$ at point $h$. Now it should be noted that these test-wires $b$ and $c$ may ordinarily be connected up and used for telephone purposes like other wires $d$ $e$ of the cable.

Suppose a circuit-breaking apparatus like that shown in Fig. 1 be placed along the length of a cable every five hundred feet, different conductors, of course, being connected with the different electro-magnets and armatures at the different stations or points along the cable. These different wires are labeled at the end where the tests are to be made, so that it may be known at what distance from the end any particular test-wire will be opened. Then, beginning with the set connected with the circuit-breaking apparatus five hundred feet away and closing the wire $b$ of said set to battery, wire $c$ will be opened, and if it is found by tests with the galvanometer that the wire $c$ thus opened is thoroughly insulated it will be inferred that the fault is not within five hundred feet, and in like manner tests may be made from point to point until the fault is localized as within a particular section of the cable.

Each section of the cable may be provided with my test-wires shown in Patent No. 293,775, of February 19, 1884.

The two sets of test-wires shown in Fig. 2 are connected with the circuit-breaking apparatus shown as hereinbefore described with respect to Fig. 1. Each wire may be used as a telephone-line.

I have indicated the usual telephone outfit placed at the two ends of one of the lines in Fig. 2.

I have shown battery $i$ connected in the circuit of wire $b$. This battery is substituted for the telephone outfit when tests are to be made.

The battery being closed to line $b$ through the electro-magnet of the circuit-breaking apparatus, wire $c$ will be opened, as before described, and is then available as a test-wire between the end of the cable and the point where it is opened. If the tests of wire $c$ indicate no escape, the battery $i$ is transferred to wire $b'$, connected with the next circuit-breaking apparatus. Wire $c'$ is thus opened, and then may be tested. In like manner tests may be made until the section containing the fault is discovered.

I preferably shunt the coils of the electro-magnets of the circuit-breaking apparatus by low-resistance wires, thus reducing as much as possible the resistance and retarding effects of the magnets when their circuits are used for telephone purposes, leaving sufficient margin for the battery to operate armatures.

Having thus described my invention, I claim as new and desire to secure by Letters Patent—

1. The combination, in a telephone cable, of electro-magnetic circuit-breaking devices distributed at intervals throughout the length of the cable, each circuit-breaking device being connected with a different pair of conductors, whereby one of any given pair of conductors may be opened when current is sent over the other wire of the pair, thus affording means of testing for escape of current at intervals throughout the length of the cable, whereby defects in the pipe may be approximately located.

2. In a telephone-cable, the coils of an electro-magnet included in the circuit of one conductor and the armature and opposing contact-point of said electro-magnet included in the circuit of another conductor, and a battery connected at the end of the cable with the conductor containing the coils of the electro-magnet, whereby the armature is separated from its opposing contact-point to open the circuit of the wire connected therewith, so that tests may be made upon said open wire from the end of the cable to locate approximately defects in the pipe, substantially as shown and described.

3. The combination, with different pairs of the conductors of a telephone-cable, of electro-magnetic circuit-breaking devices, the circuit-breaking devices of the different sets or pairs of conductors being distributed at intervals throughout the length of the cable, and electrical apparatus at the end of the cable whereby current may be sent to open the circuits of the different conductors at intervals and the wires, when open, tested to approximately locate faults in the pipe, substantially as shown and described.

In witness whereof I hereunto subscribe my name this 22d day of July, A. D. 1886.

WILLIAM R. PATTERSON.

Witnesses:
GEORGE P. BARTON,
LEOPOLD STERN.